UNITED STATES PATENT OFFICE 2,492,175

PROCESS FOR PRODUCING IRON-FREE MIXTURES OF SELENIUM AND SULFUR

James J. O'Brien, Baltimore, Md., assignor to The Glidden Company, Cleveland, Ohio, a corporation of Ohio No Drawing. Application November 29, 1946, Serial No. 713,090

9 Claims. (Cl. 252—1)

The present invention relates to an improved process for recovering selenium from crude selenium-containing materials, and relates particularly to improvements in treating the products recovered in accordance with the process of my United States Patent No. 2,264,328, patented December 2, 1941.

In accordance with the process of my patent, supra, selenium residues of the type ordinarily obtained from the treatment of various ores, from the electrolytic refining of copper and from the chamber acid processes, are treated with boiling mineral acids in the presence of elemental sulfur. Residues of the types mentioned usually contain iron and other impurities which should be removed, and frequently contain sulfur. If the sulfur content is less than about $\frac{1}{7}$ of the selenium content then sulfur should be added. Then the treatment with the boiling mineral acid will dissolve or otherwise separate out the iron and other impurities more or less completely, and a black plastic mass of selenium and sulfur remains. This mass settles to the bottom of the treating container where it solidifies when cooled. The acid may then be decanted off, after which the solidified mass may be washed off with water to remove a sludge of concentrate which generally is deposited by the acid treatment on the surface of the selenium sulfur mass.

As pointed out in my patent, the selenium sulfur crude does not dissolve in the acids but starts to melt at 70° C. forming a plastic mass intermingled with unmelted crude; at 190° C. black globules appear which finally settle out; at 235° C. liquefaction starts and from 235° C. to 260° C. the liquefaction and separation of the amorphous sulphur-selenium mixture is completed. The precipitate may be described as an amorphous mixture of selenium and sulphur which when cooled is in a solid brittle form but not crystalline.

Also as there pointed out, the phenomenon is considered to be a physical change and not a chemical change. The selenium and sulphur melt under the acid, preventing losses of selenium by volatilization, and at the same time the impurities are removed by the action of the acid, either in solution or as insolubles readily separated from the selenium-sulphur precipitate.

In connection with my patented process it should be recognized that the boiling points of sulfuric acid, varying according to concentration from 170° C. to 340° C., are well above the melting point of the selenium in the crude which starts to melt at about 70° C. and is completely liquefied from 235° C. to 260° C. It should also be understood that the melting point of pure selenium is considerably less; about 217° C. Phosphoric acid is also well suited to the process. As indicated, however, any mineral acid boiling above about 240° C. may be used.

The solidified selenium-sulfur mass produced in accordance with a treatment as described above has heretofore been melted in the treating container and then poured into pans where it has been allowed to cool. I have found that such treatment of the mass results in substantial losses of selenium, and it is the object of this invention to provide a modified treatment which not only avoids such selenium losses but which also provides a final product which is cleaner and more pure as a result of improved washing conditions. These and other objects will be apparent from the following detailed description of my improved process.

In accordance with the present invention, the solified selenium-sulfur mass having a selenium/sulfur ratio between about 7 to 1 and 2 to 1, after having been washed as thoroughly as practicable to remove the acid sludge, is next treated with boiling water. Preferably, the solidified mass is left in the original treating container and a quantity of water is added to the container after which the water is brought to a boil. At the temperature of boiling water, the selenium-sulfur mass becomes soft and plastic so that the surface accumulations of acid sludge which were not previously washed off can now be freed from the mass and dissolved in the boiling water. When this has been accomplished, heating may be discontinued. The selenium-sulfur mass is then a dense homogeneous plastic mass from which the water may be easily separated, as by decanting it. After the mass of selenium-sulfur has cooled somewhat and has become less plastic, it may be removed bodily by means of tongs or otherwise from the container. On cooling the mass further it becomes brittle and may subsequently be broken up and crushed to prepare it for use.

When the selenium-sulfur mass is treated in this manner, there is substantially no loss of selenium, and the product is cleaner than that obtained from my patented process by reason of having been washed more thoroughly.

The purified selenium-sulfur mass obtained in accordance with this invention is easily broken and ground, as indicated, and when so ground it dissolves readily in soluble sulfide solutions such as are used in making cadmium color pigments.

Having disclosed the invention, what I claim is:

1. The process for producing a substantially iron-free mixture of selenium and sulfur from material containing at least one part of sulfur to seven parts of selenium and containing iron and other impurities, said process comprising the steps of adding to said mixture a mineral acid having a boiling point sufficiently high to permit heating of the mixture to a temperature at which the selenium and sulfur contents form a liquid mass, heating said acid to temperatures sufficiently high to cause liquefaction of the selenium-sulfur mass and its separation from the heated acid; mutually separating the resulting selenium-sulfur mass from the acid; washing the surface of the mass to remove acid deposits thereon; thereafter heating the washed mass in contact with a protecting quantity of boiling water until the mass has become plastic, and subsequently mutually separating the softened mass from the water.

2. The process for producing a substantially iron-free mixture of selenium and sulfur from a selenium residue containing iron and other impurities, which process comprises the steps of dispersing the residue and sulfur in a mineral acid having a boiling point of at least about 240° C. to provide a dispersion containing a sulfur to selenium ratio of at least 1 to 7, heating the dispersion to at least about 235° C., thereby to cause liquefaction and separation of a selenium-sulfur mass; allowing said separated mass to settle and mutually separating the settled mass from the acid; washing the settled mass; then heating the washed mass in contact with a protecting quantity of boiling water until plastic and substantially free of surface residues resulting from said acid treatment; and subsequently decanting the water from the treated mass.

3. The process as claimed in claim 2 wherein the mineral acid is sulfuric acid.

4. The process as claimed in claim 2 wherein the mineral acid is phosphoric acid.

5. The process for producing a substantially iron-free mixture of selenium and sulfur from a selenium residue containing iron and other impurities, which process comprises the steps of dispersing the residue and sulfur in a mineral acid having a boiling point above about 260° C., to provide a dispersion containing a sulfur to selenium ratio of at least 1 to 7; heating the dispersion to between about 235° C. and 260° C. until a plastic mass of selenium and sulfur separates; allowing said separated mass to settle and mutually separating the settled mass from the acid; washing the settled mass; then heating the washed mass in contact with a protecting quantity of boiling water until plastic and substantially free of surface residues resulting from acid treatment; and subsequently mutually separating the water from the treated mass.

6. The process as claimed in claim 5 wherein the mineral acid is sulfuric acid.

7. The process as claimed in claim 5 wherein the mineral acid is phosphoric acid.

8. The process as claimed in claim 5 wherein the ratio of sulfur to selenium is between about 1 to 7 and 1 to 2.

9. In a process of the type wherein an impure mixture of selenium and sulfur with a selenium/sulfur ratio of at most 7 to 1 is refined by liquefying the mixture in a heated mineral acid having a boiling point sufficiently high to permit heating of the mixture to a temperature at which the selenium and sulfur contents form a liquid mass, after which the liquefied mass and acid are mutually separated and the separated mass is washed to remove sludge deposits formed on its surface by the acid treatment, the improvement which comprises heating the washed mass in contact with a protecting quantity of boiling water until the mass has become plastic and substantially free of surface residues resulting from said acid treatment, and subsequently decanting the water from the treated mass.

JAMES J. O'BRIEN.

REFERENCES CITED

The following references are of record in the file of this patent:

UNITED STATES PATENTS

| Number | Name | Date |
| --- | --- | --- |
| 2,264,328 | O'Brien | Dec. 2, 1941 |